United States Patent [19]
Wessling et al.

[11] Patent Number: 5,720,903
[45] Date of Patent: Feb. 24, 1998

[54] DISPERSIBLE INTRINSICALLY CONDUCTIVE POLYMER AND PROCESS FOR ITS MANUFACTURE

[75] Inventors: Bernhard Wessling, Bargtehelde; Holger Merkle, Jr., Ahrensburg; Susanne Blattner, Hamburg, all of Germany

[73] Assignee: Zipperling Kessler & Co. (GmbH & Co), Ahrensburg, Germany

[21] Appl. No.: 557,004

[22] PCT Filed: Apr. 6, 1994

[86] PCT No.: PCT/EP94/01060
  § 371 Date: Nov. 17, 1995
  § 102(e) Date: Nov. 17, 1995

[87] PCT Pub. No.: WO94/27297
  PCT Pub. Date: Nov. 24, 1994

[30] Foreign Application Priority Data

May 17, 1993 [DE] Germany ............ 43 17 010.2

[51] Int. Cl.⁶ ............ H01B 1/00; H01B 1/20; C08J 5/00
[52] U.S. Cl. ............ 252/500; 528/210; 528/422; 264/331.19
[58] Field of Search ............ 252/500, 518; 528/210, 422; 264/331.19

[56] References Cited

U.S. PATENT DOCUMENTS

| | | | |
|---|---|---|---|
| 4,567,250 | 1/1986 | Naarmann et al. | 528/423 |
| 4,697,000 | 9/1987 | Witucki et al. | 528/423 |

(List continued on next page.)

FOREIGN PATENT DOCUMENTS

| | | |
|---|---|---|
| 0 350 083 | 1/1990 | European Pat. Off. |
| 0 497 514 | 5/1992 | European Pat. Off. |
| 0 497 514 | 8/1992 | European Pat. Off. |
| 02155 | 3/1989 | WIPO |
| 89 02155 | 3/1989 | WIPO |

OTHER PUBLICATIONS

Theophilou et al., Highly Conducting Polyanilines and Polyacetylene/Polyaniline Composites, Springer Series in Solid-State Sciences, vol. 91, Electronic Properties of Conjugated Polymers III, 1989, pp. 31–32.

Myers, Chemical Oxidative Polymerization as a Synthetic Route to Electrically Conducting Polypyrroles, J. Electronic Mat. A5, No. 2, 6A(1986) pp. 61–69.

Shacklette et al, EMI Shielding of Intrinsically Conductive Polymers, Reprinted from In Search of Excellence, Proceedings of the SPE 49th Annual Technical Conference and Exhibits, Antec '91, pp. 665–667.

Naamann et al., New Process For the Production Of Metal-Like Stable Polyacetylene, Synthetic Metals, vol. 22, Nov. 1987, pp. 1–8.

Cao et al., Counter–ion induced processibility of conducting polyaniline and of conducting polyblends of polyaniline in bulk polymers, Synthetic Metals, vol. 48, No. 1, Jun. 15, 1992, pp. 91–97.

Heeger, Polyaniline With Surfactant Counterions; Conducting Polymer Materials Which Are Processible In the Conducting Form, Synthetic Metals, vol. 57 (1993) 3471–3482.

Nimtz et al., Size–limited conductivity in submicrometre metal particles. Similarities with conducting polymers?, Synthetic Metals, vol. 45, No. 2, Nov. 1991, pp. 197–201.

Primary Examiner—Paul Lieberman
Assistant Examiner—M. Kopec
Attorney, Agent, or Firm—Cushman Darby & Cushman Intellectual Property Group of Pillsbury Madison & Sutro LLP

[57] ABSTRACT

A dispersible, intrinsically conductive polymer having an electrical conductivity (measured in a 4-point measuring cell on a powder pellet) of $2.5 \times 10^1$ to $2.5 \times 10^5$ S/cm is obtained when a dispersible intrinsically conductive polymer in powder form having a starting conductivity of 1 to 5 S/cm is rubbed and/or dispersed in the presence of a non-polymeric polar substance applying sufficient shear forces until the desired increased electrical conductivity is reached.

11 Claims, 1 Drawing Sheet

U.S. PATENT DOCUMENTS

| | | | |
|---|---|---|---|
| 4,929,388 | 5/1990 | Wessling | 252/500 |
| 4,935,164 | 6/1990 | Wessling et al. | 252/500 |
| 5,174,867 | 12/1992 | Naarmann et al. | 252/500 |
| 5,204,423 | 4/1993 | Franquinet et al. | 526/256 |
| 5,217,649 | 6/1993 | Kulkarni et al. | 252/500 |
| 5,567,355 | 10/1996 | Wessling et al. | 252/500 |
| 5,595,689 | 1/1997 | Kulkarni et al. | 252/500 |

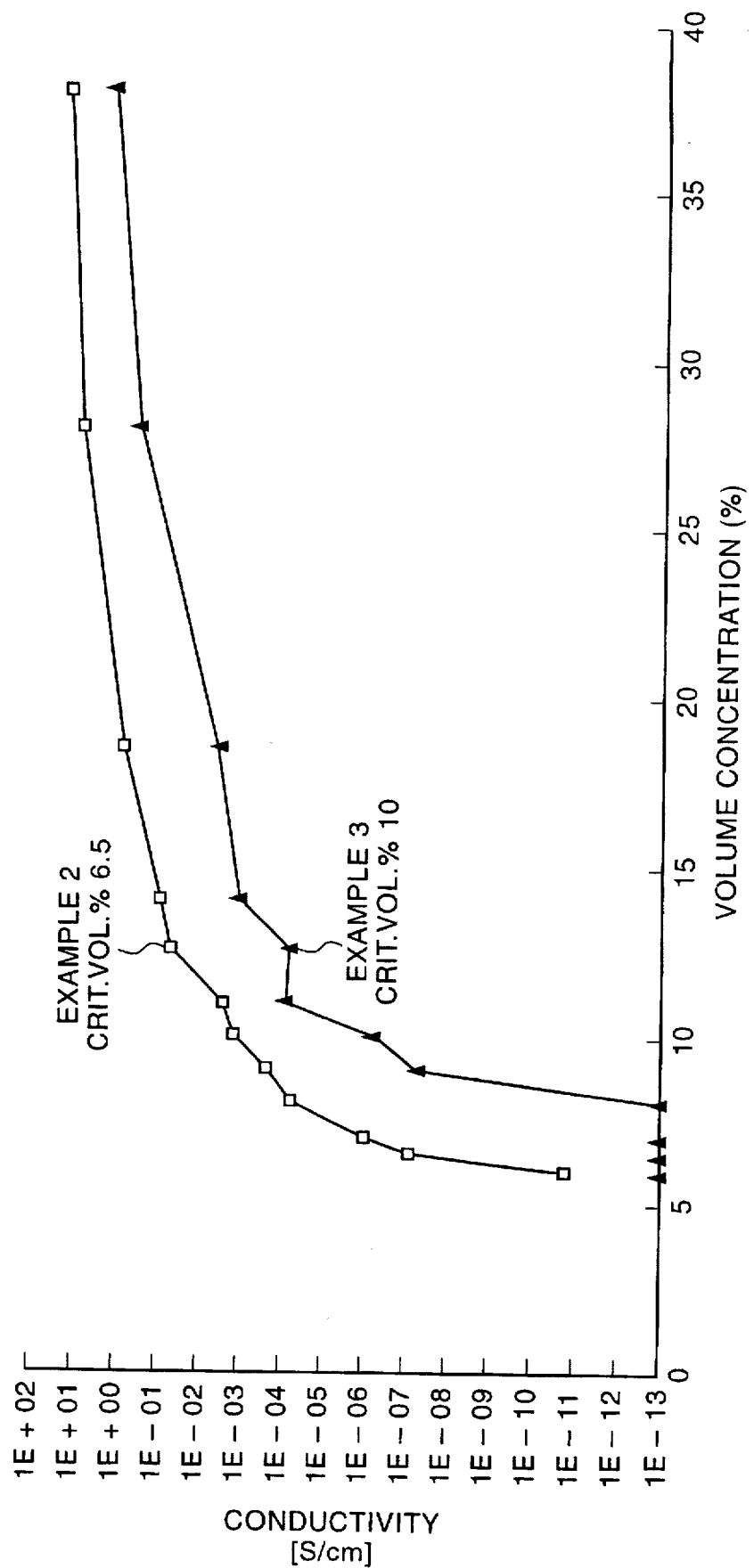

DISPERSIBLE INTRINSICALLY CONDUCTIVE POLYMER AND PROCESS FOR ITS MANUFACTURE

STATE OF THE ART

Known from DE-A-37 29 566 are intrinsically conductive polymers, in particular dispersible intrinsically conductive polymers in powder form which are important for industrial application. The definitions and terms contained in this published application are also used in the following and are therefore included in the disclosure.

The intrinsically conductive polymers and their dispersible forms known to date as a rule have conductivities between about 1 and 5 S/cm both in powder form and in the form of self-supporting films or non-self-supporting coatings. As is known from the publication by L. Shacklette et al., Proc. 49th SPE Am. Tech. Conf. 1991, 665 ("EMI-shielding"), a shield damping of 40 db can be achieved with these conductivities in the case of a layer thickness of 3 mm, which represents a minimum requirement for many industrial applications. Industrial applications are by their nature limited because of the conductivity of 1 to 5 S/cm (i.e. approx. $2.5 \times 10^0$ S/cm) which hitherto it has been impossible to exceed on an industrial scale, and even in most cases on a laboratory scale, both in the case of use as pure polymers and as a dispersion in a polymer blend, and because of the associated necessary layer thicknesses of 3 mm.

There is therefore a need to increase the conductivity of intrinsically conductive polymers—not only for applications in EMI shielding. In particular, there is a need to increase the conductivity of dispersible conductive polymers, preferably polyaniline, in order to also equip the dispersions important for industrial applications (in thermoplastic or non-thermoplastic polymers, in lacquers or solvents) with higher conductivity.

In recent years considerable efforts have been made in this scientific field to achieve higher conductivities. The following processes have hitherto been used for this purpose on a laboratory scale:

1. Polymerization of polyacetylene in viscous non-polar media, subsequent drawing and, subsequent to this, doping with iodine (Naarmann and Theophilou, Synthet. Met.) 22, 1 (1987). Conductivities of a few $10^4$ S/cm have been achieved. The process has the disadvantage that it is difficult to carry out and difficult to reproduce and leads to a conductive polymer which is not air- and oxidation-stable and cannot be further processed.

2. Polypyrrole can sometimes be polymerized under special electrochemical conditions to give films which have a conductivity of a few $10^2$ S/cm. This process has the disadvantage that only self-supporting films can be produced which cannot be further processed and likewise are not sufficiently stable at higher temperatures.

3. In the case of polyaniline, higher conductivities have recently been reported, thus first by Y. Cao et al. in Synthet. Met. 48, 91 (1992) and A. Heeger et al. in "Proceedings of the International Conference on Science and Technology of Synthetic Metals", Gothenburg 1992 (Synthet. Met. 55–57 (1993), being printed). In this process, polyaniline protonated ("doped") with HCl is synthesized, neutralized to emeraldine and protonated again with another acid, preferably camphor sulphonic acid, in the presence of e.g. m-cresol. Non-dispersible self-supporting films form which have a conductivity of approx. $1.5 \times 10^2$ S/cm. In addition to the non-dispersibility and the great cost of the process, another disadvantage is to be seen in the fact that some of the m-cresol remains in the conductive, film-like composition, and that toxicological problems result both during the process and in later use. According to details from the authors and according to interpretations of other scientists (inter alia A. McDiarmid), the principle of the process is that camphor sulphonic acid induces a solubility of polyaniline ("Camphor sulphonic acid induced solubility of PAni") and m-cresol acts as secondary doping agent ("secondary dopant"). Investigations by A. Heeger and A. McDiarmid have shown that the crystallinity of the polyaniline is increased by the process.

4. N. Theophilou et al., Solid State Sci 91 (Kuzmany et al.ed.), 29 (1989) have already previously reported higher conductivities of approx. $10^2$ S/cm when neutral polyaniline films (films of emeraldine) were drawn and then doped. No wide-ranging work has however been carried out in this field.

To summarize, the disadvantage of the processes known to date is thus the fact that complicated, multi-step processes, and/or a subsequent doping stage are required, and that other fundamental disadvantages exist, above all the fact that the products which form can no longer be further processed or dispersed. There is thus also a need to provide a dispersible intrinsically conductive polymer, preferably a dispersible polyaniline, in a powder form suitable for further processing which has a conductivity at least one order higher than the hitherto existing dispersible polyaniline types of about $2.5 \times 10^0$ S/cm.

It is therefore the object of the invention to provide a dispersible electrically conductive polymer, preferably polyaniline, in powder form which has a conductivity of $2.5 \times 10^1$ to $2.5 \times 10^5$ S/cm.

THE INVENTION

The invention comprises the dispersion, after polymerization and processing, of a dispersible, intrinsically conductive polymer, preferably polyaniline, produced according to the instructions of patent DE-A-37 29 566—it not being important whether the obtained polymer is already completely dry or not—in a second step in the presence of a non-polymeric polar substance. The polar substance (which could also be called "dispersion aid") has the following properties:

it has a surface tension of more than 30 dyne/cm, it is not electrically conductive (i.e. it has an electrical conductivity of less than $10^{-6}$ S/cm), it can be liquid or solid, it is inert vis-à-vis the conductive polymer used, i.e. engages in no noteworthy chemical reactions with it; above all, oxidative or reductive and acid-base reactions are not desired, it is not necessarily a dispersion aid under normal conditions.

Examples of such polar substances are a) solids: barium sulphate; titanium dioxide, in particular ultra-fine titanium dioxide with a grain size of less than 300 nm; organic pigments such as pigment Yellow 18;

b) inert solvents: water, DMF, DMSO, γ-butyrolactone, NMP and other pyrrolidone derivatives, dioxane, THF, this listing being by way of example and in no way limiting.

It is essential to the invention that the substances used are rubbed and/or dispersed together with the polyaniline or other dispersible, intrinsically conductive polymers using sufficient shear forces until the desired increased electrical conductivity is attained, this dispersion taking place in powder form in the form of a tappable or pumpable paste or in the form of a flowable suspension. Dispersion can take place in high-speed mixers (e.g. so-called fluid mixers) or under ultrasound for at least 3 minutes. In ball mills, on triple-roll mills or in other units with high shear force a longer treatment time, e.g. at least 6 hours, is needed. The simultaneous use of an electric field, in particular an alternating electric field with frequencies between 10 kHz and 10 GHz, can be advantageous; in this case more than 24 hours are needed in most instances.

The polar, non-conductive substance which is inert vis-á-vis the intrinsically conductive polymer is added in such a quantity that a weight ratio between 2:1 and 1:10 results between the conductive polymer powder and the polar substance.

After dispersion of the intrinsically conductive polymer in the presence of the polar, non-conductive, inert substance, a powder pellet can e.g. be produced directly (e.g. in a pressing device, as is used for producing KBr pellets for infra-red spectroscopy). When the second additive has been added in a quantity of between 50 and 200 parts to 100 parts of the conductive polymer, a powder pellet can be produced directly. This already has conductivities of more than $2.5 \times 10^1$ S/cm. The polar additive can however also be removed by suitable techniques such as e.g. dissolution or extraction and the obtained conductive polymer, which as before is a dispersible powder, can be dried and then a pellet produced. This also has a conductivity of at least $2.5 \times 10^2$ S/cm. Conductivities between $2.5 \times 10^1$ S/cm and $2.5 \times 10^2$ S/cm can be obtained regularly and reproducibly, in particular when the polyaniline obtainable commercially under the trade name VERSICON® (Allied Signal Inc., Morristown), which is produced according to the instructions of DE-B-37 29 566, was used. Conductivities above a few $10^2$ to up to $2.5 \times 10^5$ S/cm are likewise possible.

Removal of the added polar, inert and non-conductive substance is however not required as long as further processing and the use of the conductive polymer is not impaired by the presence of the added substance. The conductivity of the polymer powder is not impaired by the presence of the polar dispersion aid.

The obtained dispersible powders of intrinsically conductive polymers, in particular the dispersible polyaniline powders obtainable according to the invention are dispersible and further processable using the process already described earlier and, surprisingly, lead to extremely high conductivities even in polymer-containing dispersions (polymer blends or lacquers). Thus, e.g. in the case of polyaniline at concentrations between 25% and 40% conductivities of clearly more than $2.5 \times 10^1$ S/cm have been observed and are possible even after further thermoplastic or lacquering processing. The dispersible polyaniline powders according to the invention are thus unrestrictedly suitable for further processing after the dispersion process, both in the pure form and in the form of polymer blends, lacquers etc.

An interpretation of the high conductivity of the novel intrinsically conductive polymer powder or an explanation for the surprising success of the process cannot as yet be given. Whilst the processes known to date which are described in the state of the art are based on the fact that the chains of the conductive polymers are re-oriented and preferably drawn, the process described here proceeds, not at the chains, but at the primary particles of the conductive polymers. It is conceivable that insulating dirt layers on the surface of the primary particles of the conductive polymer are "rubbed off", but this eludes analytical appraisal because of the small quantities. It is also conceivable that in the course of the dispersion processes the primary particles adopt a different type of orientation to one another, whilst the arrangement of the chains in the primary particles can undergo no change because of the process conditions used.

If, following Nimtz et al. (Synthet. Met. 45, 197 (1991)), conductive polymers are regarded as ultrafine metal particles which are limited in their conductivity in terms of quantum mechanics, a different type of orientation of the particles to one another could extend the correlation length of the electron waves and therefore cause a higher conductivity. However, this is all speculation at the present time, merely serving to emphasize that no indications whatsoever that the dispersion process described here would lead to an as yet unobserved increase in conductivity for dispersible powders of intrinsically conductive polymers were to be deduced from the level of knowledge existing at present.

The decisive advantage of the new process is to be seen in the fact that a generally applicable process for dispersible powders of conductive polymers, preferably polyaniline, is provided which in turn makes available a dispersible, powdery raw material which is suitable for further processing.

The following examples serve to illustrate the invention.

EXAMPLE 1

Polyaniline (VERSICON®, trade commercial from Allied Signal Inc., Morristown) was intensively dispersed as dry powder in a laboratory high-speed mixer for 3 minutes with the substances used in the following table in the ratio quoted in each case. The mixture was then pressed in a press which is used to press KBr for infra-red spectra to transparent pellets (diameter 13 mm) at a pressure of 10 t for at least 30 seconds such that a solid pellet could be removed. This was tested in a 4-point measuring cell for its conductivity. The conductivity values given in the Table were found.

TABLE 1

| No. | Inert additive | Ratio of PAni:additive | Conductivity S/cm |
|---|---|---|---|
| 1.1 (comparative test) | Polyaniline powder (VERSICON®) | — | $5 \cdot 10^0$ |
| 1.2 | Butyrolactone | 1:0.5 | $3 \cdot 10^1$ |
| 1.3 | Butyrolactone | 1:1 | $4 \cdot 10^1$ |
| 1.4 | Butyrolactone | 1:2 | $6.5 \cdot 10^1$ |
| 1.5 | Paliotol yellow K0961 | 3:1 | $2.5 \cdot 10^1$ |
| 1.6 | n-methyl-2-pyrrolidone | 3:1 | $3 \cdot 10^1$ |

EXAMPLE 2

The powder obtained in the tests from Example 1.3 was dispersed in varying concentrations in a laboratory kneader with PETG 6763 (a polyethylene terephthalate copolymer from Eastman Kodak) in the melt at approx. 190° C. The resulting polymer blend was pressed into sheets, cooled and tested in a 4-point measuring cell for its conductivity. A critical volume concentration of between 6 and 8 vol. % was obtained (see FIG. 1).

EXAMPLE 3 (COMPARATIVE TEST)

VERSICON® powder, which was not re-dispersed according to Example 1, was pressed in the same press to a pellet. A conductivity of 3 S/cm resulted. A further sample was taken from the same powder and dispersed in the melt according to Example 2 in PETG 6763. A critical volume concentration of 10% resulted (see FIG. 1).

EXAMPLE 4

The product from test No. 1.3 was mixed into PMMA Degalan LP 64/12 in a concentration of 30% in the melt at approx. 180° C. A conductivity of $4 \times 10^1$ S/cm resulted.

EXAMPLE 5

The following tests were carried out under ultrasound, whereby
- in the case of a suspension a test tube was dipped into an ultrasonic bath and was intensively subjected to ultrasonics from outside,
- in the case of a dry powdery or pasty mixture a sonotrode (as described in EP-B-168 620) was dipped directly into the mixture. The following conductivity values resulted for the pellets which had been produced in Example 1.

TABLE 2

| No. | Inert additive | Ratio of PAni:additive | Conductivity S/cm |
|---|---|---|---|
| 5.1 (comparative test) | Polyaniline powder (VERSICON ®) | — | 5 |
| 5.2 | butyrolactone | 1:1 | $4 \cdot 10^1$ |
| 5.3 | butyrolactone | 1:5 | $1 \cdot 10^2$ |

What is claimed is:

1. A dispersible intrinsically conductive polymer powder comprising a polyaniline powder and having an electrical conductivity measured with use of a 4-point measuring cell on a pellet of said powder between about $2.5 \times 10^1$ and about $2.5 \times 10^5$ S/cm.

2. A process for the production of an intrinsically conductive polymer powder comprising the combination of steps of:

rubbing, dispersing, or a combination thereof, a dispersible, intrinsically conductive polymer in powder form having a starting electrical conductivity of between about 1 and about 5 S/cm in the presence of a non-polymeric polar substance, and applying sufficient shear force until electrical conductivity of a pellet of said powder between about $2.5 \times 10^1$ and about $2.5 \times 10^5$ S/cm is reached.

3. A process according to claim 2, wherein said polar substance has a surface tension of greater than about 30 dyne/cm.

4. A process according to claim 2, wherein said intrinsically conductive polymer and said polar substance are present in a weight ratio of between about 2:1 and about 1:10 and then dispersed.

5. A process according to claim 2, wherein after said dispersing step, said polar substance is removed by selective dissolution or extraction.

6. A process according to claim 2, wherein said dispersing step is carried out in a high-speed mixer.

7. A process according to claim 2, wherein said dispersing step is carried out in a ball mill.

8. A process according to claim 2, wherein said dispersing step is carried out under ultrasound.

9. A process according to claim 2, wherein said dispersing step is carried out in the presence of an electric field.

10. A process according to claim 9, wherein said dispersing step is carried out in the presence of an alternating electric field having a frequency between 10 kHz and 10 GHz.

11. A process according to claim 2, wherein said polar substance is selected from the group consisting of barium sulphate, titanium dioxide, organic pigments, water, DMF, DMMSO, γ-butyrolactone, N-methyl-2-pyrrolidone, NMP, dioxane and THF.

* * * * *